(12) United States Patent
Togino

(10) Patent No.: US 8,339,719 B2
(45) Date of Patent: Dec. 25, 2012

(54) OPTICAL APPARATUS

(75) Inventor: Takayoshi Togino, Shibuya-ku (JP)

(73) Assignee: Olympus Corporation, Tokyo (JP)

( * ) Notice: Subject to any disclaimer, the term of this patent is extended or adjusted under 35 U.S.C. 154(b) by 584 days.

(21) Appl. No.: 12/450,644

(22) PCT Filed: Mar. 19, 2008

(86) PCT No.: PCT/JP2008/055805
§ 371 (c)(1),
(2), (4) Date: Oct. 1, 2009

(87) PCT Pub. No.: WO2008/120650
PCT Pub. Date: Oct. 9, 2008

(65) Prior Publication Data
US 2010/0091393 A1    Apr. 15, 2010

(30) Foreign Application Priority Data
Apr. 2, 2007   (JP) .................................. 2007-096175

(51) Int. Cl.
*G02B 5/04* (2006.01)
(52) U.S. Cl. ........................................ 359/834; 348/118
(58) Field of Classification Search .................. 359/631, 359/633, 834; 348/118
See application file for complete search history.

(56) References Cited

U.S. PATENT DOCUMENTS

| | | | |
|---|---|---|---|
| 4,750,810 A * | 6/1988 | Tomlin et al. | ............... 359/640 |
| 6,545,810 B1 | 4/2003 | Takada et al. | |
| 6,876,390 B1 * | 4/2005 | Nagata | ........................... 348/335 |
| 2003/0095182 A1 | 5/2003 | Imoto | |
| 2005/0088762 A1 | 4/2005 | Ohashi | |
| 2006/0114576 A1 | 6/2006 | Togino | |

FOREIGN PATENT DOCUMENTS

| | | |
|---|---|---|
| DE | 102 53 378 | 6/2003 |
| JP | 10-307260 | 2/1998 |
| JP | 10-307260 | 11/1998 |
| JP | 2000-89301 | 3/2000 |
| JP | 2003-207836 | 7/2003 |
| JP | 2004-341509 | 12/2004 |
| JP | 2005-128286 | 5/2005 |
| JP | 2006-259658 | 9/2006 |

* cited by examiner

*Primary Examiner* — Alessandro Amari
(74) *Attorney, Agent, or Firm* — Kenyon & Kenyon LLP

(57) ABSTRACT

The invention relates to an optical apparatus allowing images in multiple directions to be simultaneously taken with simple construction using a prism optical system yet with high definitions even at wide angles of view. Specifically, the invention provides an optical apparatus using a prism optical system which has three optical surfaces: a first surface having transmission, a second surface having internal reflection plus transmission and a third surface having reflection and is formed of a medium having a refractive index of 1.3 or greater and in which light enters the medium through the first surface, is totally reflected at the second surface, and then reflected at the third surface 13, and finally leaves the medium this time through the second surface. At least two prism optical systems (101, 102) are arranged side by side with respect to an imaging plane of a single imaging device (30) so that images in at least two directions are formed side by side on the imaging plane of the single imaging device (30), and at least one of three surfaces of each of said prism optical systems (101, 102) has a reflecting surface defined by a rotationally asymmetric plane.

5 Claims, 11 Drawing Sheets

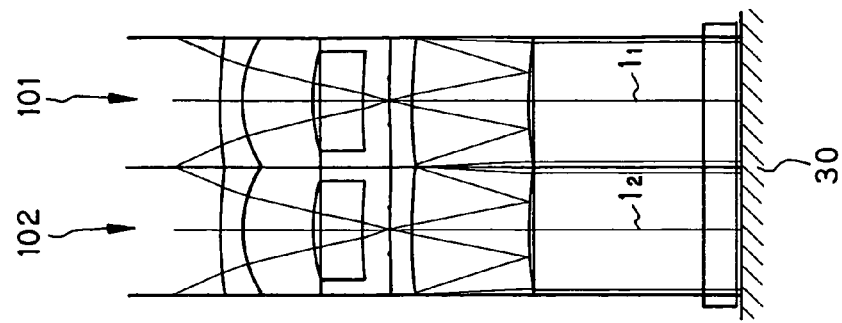
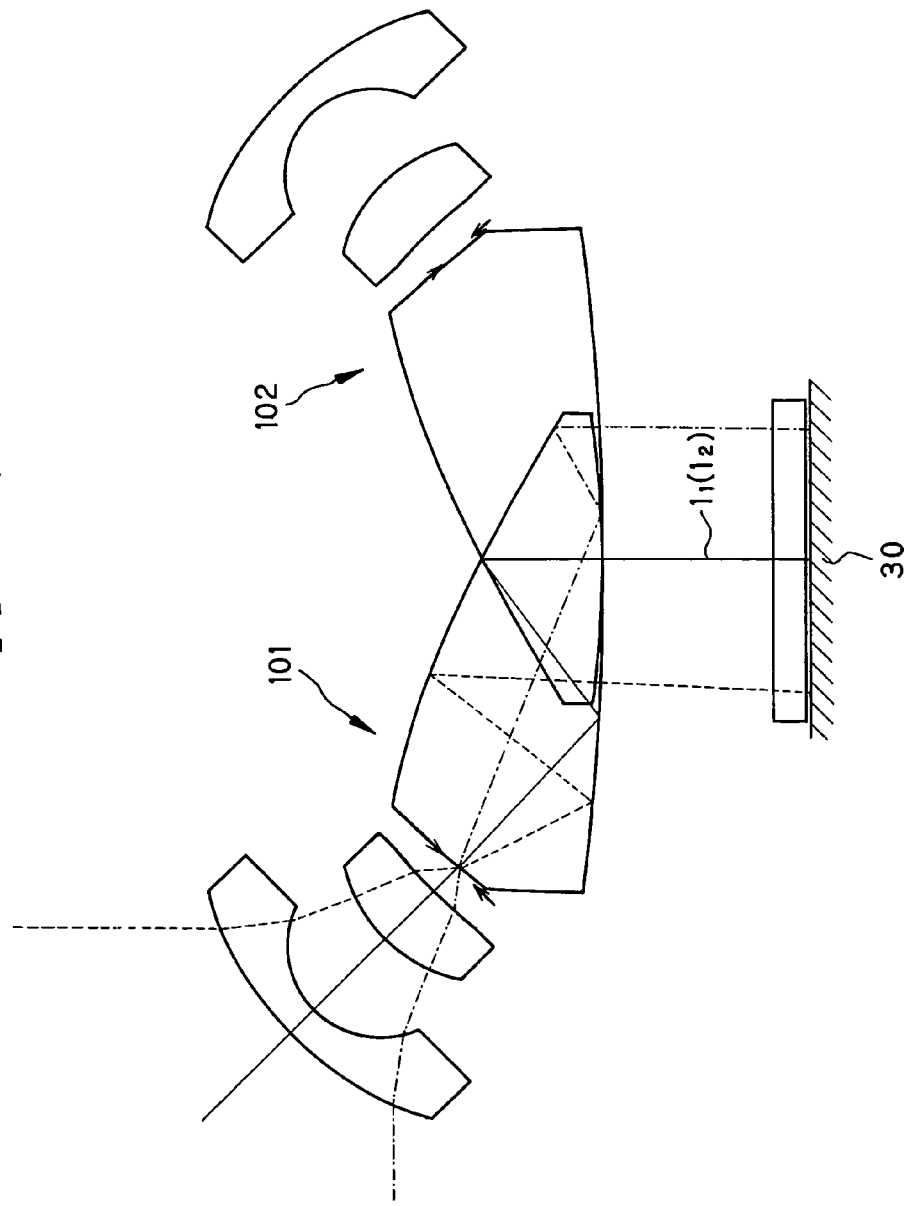
FIG. 2(a)
FIG. 2(b)

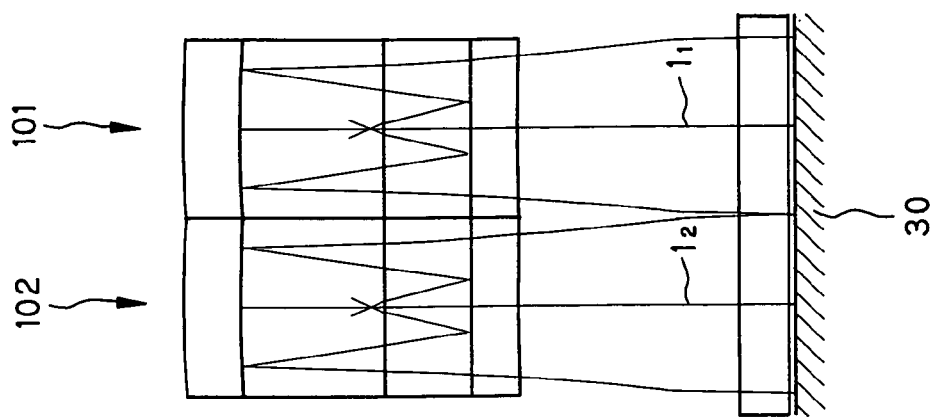
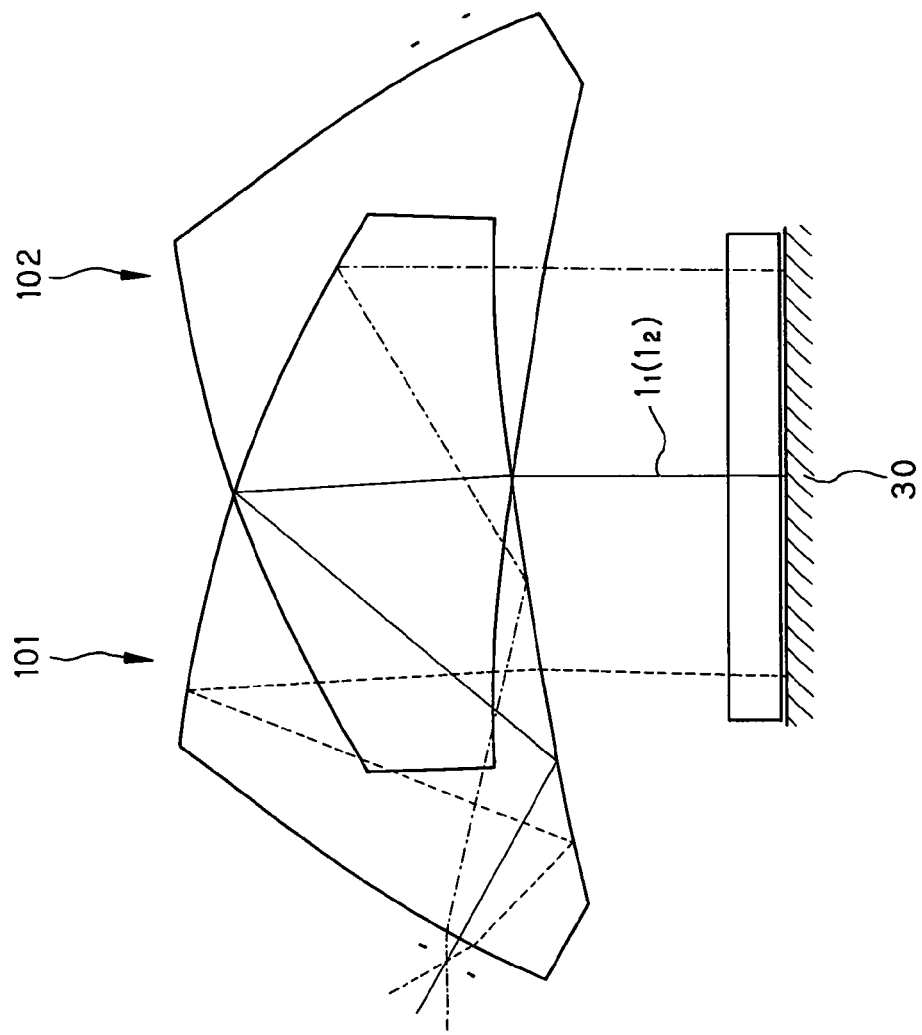

OPTICAL APPARATUS

TECHNICAL FIELD

The present invention relates generally to an optical apparatus, and more particularly to an optical apparatus capable of simultaneously taking images in different directions with a single imaging device.

BACKGROUND ART

Among already known on-vehicle cameras capable of simultaneously viewing both the right and left directions, there is an imaging apparatus wherein images in both the right and left directions are arranged and taken on the same imaging plane with one or two prisms provided in front of an imaging lens (see Patent Publications 1 and 2).

Among already known small-format imaging optical systems capable of producing less distorted images at wide angles of view, on the other hand, there is a prism optical system that, as set forth in Patent Publication 3 or the like, comprises a first surface having transmission, a second surface having reflection plus transmission and a third surface having reflection, wherein at least the surface having reflection is constructed of a rotationally asymmetric plane.

[Patent Publication 1]
JP(A) 2000-89301
[Patent Publication 2]
JP(A) 2004-341509
[Patent Publication 3]
JP(A) 10-307260

With the conventional imaging apparatus capable of taking images in both the right and left directions with a prism provided in front of the imaging lens, however, the angles of view in the right and left directions become inevitably narrow because the angle of view of the imaging lens is divided into two equal parts: one for taking images in the left direction and another for taking images in the right direction. The resolving power depends on the imaging lens; trying to increase the resolving power around the angle of view unavoidably makes the imaging lens structurally complicated.

DISCLOSURE OF THE INVENTION

With such problems with the prior art in mind, it is an object of the present invention to achieve an optical apparatus allowing images in multiple directions to be simultaneously taken with simple construction using a prism optical system yet with high definitions even at wide angles of view.

According to the present invention, the aforesaid object is accomplishable by the provision of an optical apparatus using a prism optical system which has three optical surfaces: from an object side thereof, a first surface having transmission, a second surface having internal reflection plus transmission and a third surface having reflection and is formed of a medium having a refractive index of 1.3 or greater and in which light enters the medium through the first surface 11, is totally reflected at the second surface 12 and then reflected at the third surface 13, and finally leaves the medium this time through the second surface 12, characterized in that at least two said prism optical systems are arranged side by side with respect to an imaging plane of a single imaging device so that images in at least two directions are formed side by side on the imaging plane of the single imaging device, and at least one of three surfaces of each of said prism optical systems has a reflecting surface defined by a rotationally asymmetric plane.

Preferably in this case, two said prism optical systems are arranged side by side, and said two prism optical systems comprise prism optical systems that are of the same shape and positioned such that one of said prism optical systems is rotated 180° with respect to another and about axial chief rays directing toward an image plane to keep said axial chief rays parallel with one another.

Preferably in that case, said two prism optical systems are provided between them with a light block member for blocking off light from the adjacent prism optical systems.

Preferably, the optical apparatus further includes a hood that is located on an object side with respect to said prism optical systems and adapted to block off light rays that are incident on adjacent said prism optical systems and, once passing through one of said prism optical systems, enters another.

Typically, the above optical apparatus may be used as an on-vehicle camera capable of simultaneously viewing both the right and left directions.

With the present invention as described above, it is possible to achieve an optical apparatus allowing images in multiple directions to be simultaneously taken with simple construction using a prism optical system yet with high definitions even at wide angles of view.

BRIEF DESCRIPTION OF THE DRAWINGS

FIGS. 2(a) and 2(b) are illustrative in perspective and side of the optical apparatus of Example 1 using two such optical systems as in FIG. 1, as viewed from above and below.

FIGS. 9(a) and 9(b) are illustrative in perspective and side of the optical apparatus of Example 1 using two such optical systems as in FIG. 8, as viewed from above and below.

BEST MODE FOR CARRYING OUT THE INVENTION

Examples 1, 2 and 3 of the inventive optical apparatus are now explained. Note here that constituting parameters in each example will be given later.

First of all, reference is made to the coordinate system, decentered surfaces, and free-form surfaces used in the following examples.

Figure 1:
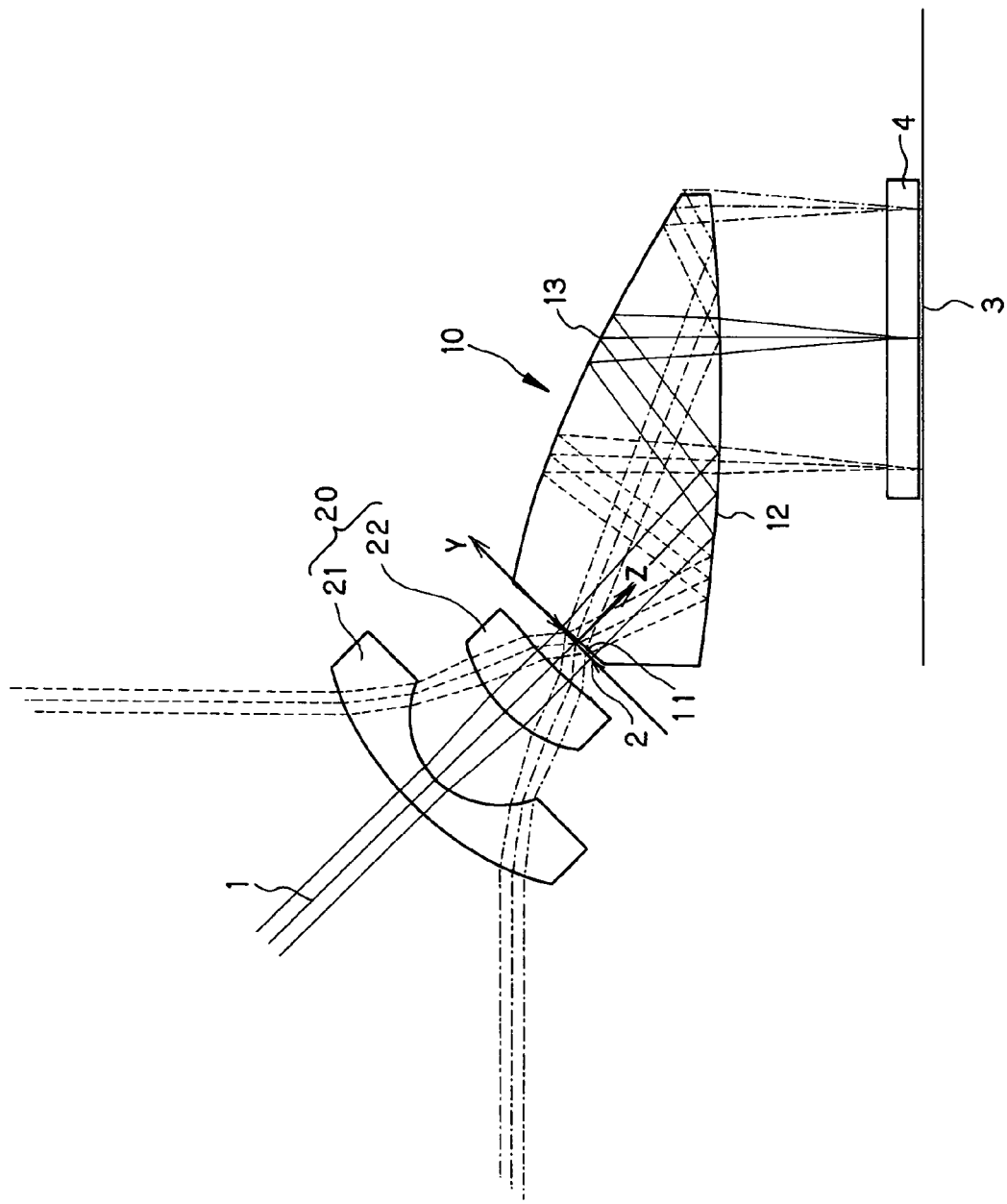
FIG. 1 is illustrative in the section including axial chief rays of one optical system in the optical apparatus of Example 1 according to the invention.

In each example, an axial chief ray 1 is defined by a light ray that leaves the center of an object, passes through the center of a stop 2, and arrives at the center of an image plane 3, as shown in FIG. 1. And with the origin defined by the center of the stop 2, the direction of travel of the axial chief ray 1 is taken as the Z axis positive direction; a plane including that Z axis and the center of the image plane is taken as the Y-Z plane; the direction that is orthogonal to the Y-Z plane through the origin and passes through the paper downward is taken as the X axis positive direction; and an axis that forms a right-handed orthogonal coordinate system with the X and Z axes is taken as the Y axis.

In Examples 1, 2 and 3, each surface is decentered within that Y-Z plane, and only one plane of symmetry for each rotationally asymmetric surface is given by the Y-Z plane.

Given for a decentered surface are the amount of decentration of the apex of that surface from the center of the origin of the thus determined coordinate system (X, Y and Z in the X, Y and Z axis directions) and the angles ($\alpha$, $\beta$, $\gamma$(°)) of tilt of the center axis (the Z axis in the following formula (a) for a free-form surface and the Z axis in the following formula (b) for an aspheric surface) with respect to the X axis, the Y axis, and the Z axis, respectively. It is here noted that the positive $\alpha$ and $\beta$ mean counterclockwise rotation with respect to the positive directions of the respective axes, and the positive $\gamma$ means clockwise rotation with respect to the positive direction of the Z axis. Regarding to how to rotate the center axis $\alpha$, $\beta$ and $\gamma$ of the surface, first of all, the center axis of the surface and its XYZ orthogonal coordinate system are a rotated counterclockwise about the X axis. Then, the center axis of the thus rotated surface is $\beta$ rotated counterclockwise about the Y axis of a new coordinate system, and the once rotated coordinate system is $\beta$ rotated counterclockwise about the Y axis, too. Then, the center axis of the twice rotated surface is $\gamma$ rotated clockwise about the Z axis of another new coordinate system.

Regarding the optical action surfaces forming the optical system of each example, when a specific surface and the subsequent surface form a coaxial optical system, there is a spacing given. Besides, the refractive indices and Abbe's constants of the media are given as usual.

The free-form surface used here is defined by the following formula (a). Note here that the axis of the free-form surface is given by the Z axis for that defining formula.

$$Z = \frac{(r^2/R)}{[1 + \sqrt{\{1 - (1+k)(r/R)^2\}}]} + \sum_{j=1}^{66} C_j X^m Y^n \quad (a)$$

Here the first term of formula (a) is the spherical one and the second term is the free-form surface one.

In the spherical term,
R is the radius of curvature of the apex,
k is the conic constant, and
$r = \sqrt{(x^2 + Y^2)}$
The free-form surface term is $$\sum_{j=1}^{66} C_j X^m Y^n = C_1 + C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

Here $C_j$ (j is an integer of 1 or greater) is a coefficient.

In general, the aforesaid free-form surface has no symmetric surface at both the X-Z plane and the Y-Z plane. However, by reducing all the odd-numbered terms for X down to zero, that free-form surface can have only one symmetric surface parallel with the Y-Z plane. For instance, this may be achieved by reducing down to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

By reducing all the odd-numbered terms for Y down to zero, the free-form surface can have only one symmetric surface parallel with the X-Z plane. For instance, this may be achieved by reducing down to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

In any one of the directions of the aforesaid symmetric surface, there is a symmetric surface provided and in association with this, for instance, the direction of decentration of the optical system with respect to the symmetric surface parallel with the Y-Z plane is set in the Y axis direction while the direction of decentration of the optical system with respect to the symmetric surface parallel with the X-Z plane is set in the X axis direction. This in turn makes it possible to improve productivity while, at the same time, rotationally asymmetric aberrations from decentration are effectively corrected.

The aforesaid defining formula (a) is given only by way of example as described above. However, it goes without saying that the invention here is characterized in that by use of the free-form surface that is symmetric with respect to plane and has only one plane of symmetry, rotationally asymmetric aberrations from decentration are corrected while, at the same time, productivity is improved, and there are similar advantages obtained for any other defining formulae, too.

The aspheric surface used here is a rotationally symmetric aspheric surface given by the following defining formula:

$$Z = \frac{(Y^2/R)}{[1 + \{1 - (1+k)Y^2/R^2\}^{1/2}]} + aY^4 + bY^6 + cY^8 + dY^{10} + \ldots \quad (b)$$

Note here that Z is taken as an optical axis (axial chief ray) provided that the direction of travel of light is positive, and Y is taken as a direction vertical to the optical axis, and that R is the paraxial radius of curvature, k is the conic constant, and a, b, c, d, are the fourth-order, the sixth-order, the eighth-order, the tenth-order aspheric coefficients, respectively. The Z axis of this defining formula becomes the axis of the rotationally symmetric aspheric surface.

Also note that the term concerning the free-form surface with no data given to it is zero. Refractive index is given on a d-line (of 587.56 nm) basis, and length is given in mm.

FIG. 1 is a Y-Z sectional view, including an axial chief ray 1, of one optical system in the optical apparatus of Example 1. This optical system is made up of a front unit 20 that is located on an object side with respect to a stop 2 and comprises a rotationally symmetric optical system, a decentered prism optical system 10 located on an image side with respect to the stop 2, and an image plane 3, with a cover glass 4 positioned in front of the image plane 3. The front unit 20 is made up of a negative meniscus lens 21 convex on its object side and a positive meniscus lens 22 convex on its object side, and the decentered prism optical system 10 is formed of a medium that includes a first surface 11 that is an entrance surface having transmission, a second surface 12 that has reflection plus transmission and a third surface 13 having reflection and has a refractive index of 1.3 or greater. Light rays from an object that pass through the stop 2 via the front unit 20 enter the medium through the first surface 11, are totally reflected at the second surface 12 and then reflected at the third surface 13. The reflected light rays leave the decentered prism optical system 10 this time through the second surface 12, forming an object image on the image plane 3 via the cover glass 4.

And the first surface 11, the second surface 12 and the third surface 13 of the decentered prism optical system 10 are each constructed of a free-form surface having the Y-Z plane as only one plane of symmetry, and designed in such a rotationally asymmetric surface shape as to give power to light beams and correct aberrations resulting from decentration. For correction of aberrations resulting from decentration, it is effective to configure especially the reflecting surface into such a surface shape.

For the image-side surface of the negative meniscus lens 21, and the object-side surface of the positive meniscus lens 22 in the front unit 20, rotationally symmetric aspheric surfaces are used.

Thus, by using for the optical system in the optical apparatus the decentered prism optical system 10 in which at least one of three surfaces is constructed of a rotationally asymmetric plane, it is then possible to set up an imaging optical system that is simple in construction with a reduced parts count and capable of taking less distorted images with high peripheral resolution even at wide angles of view.

Figure 3:
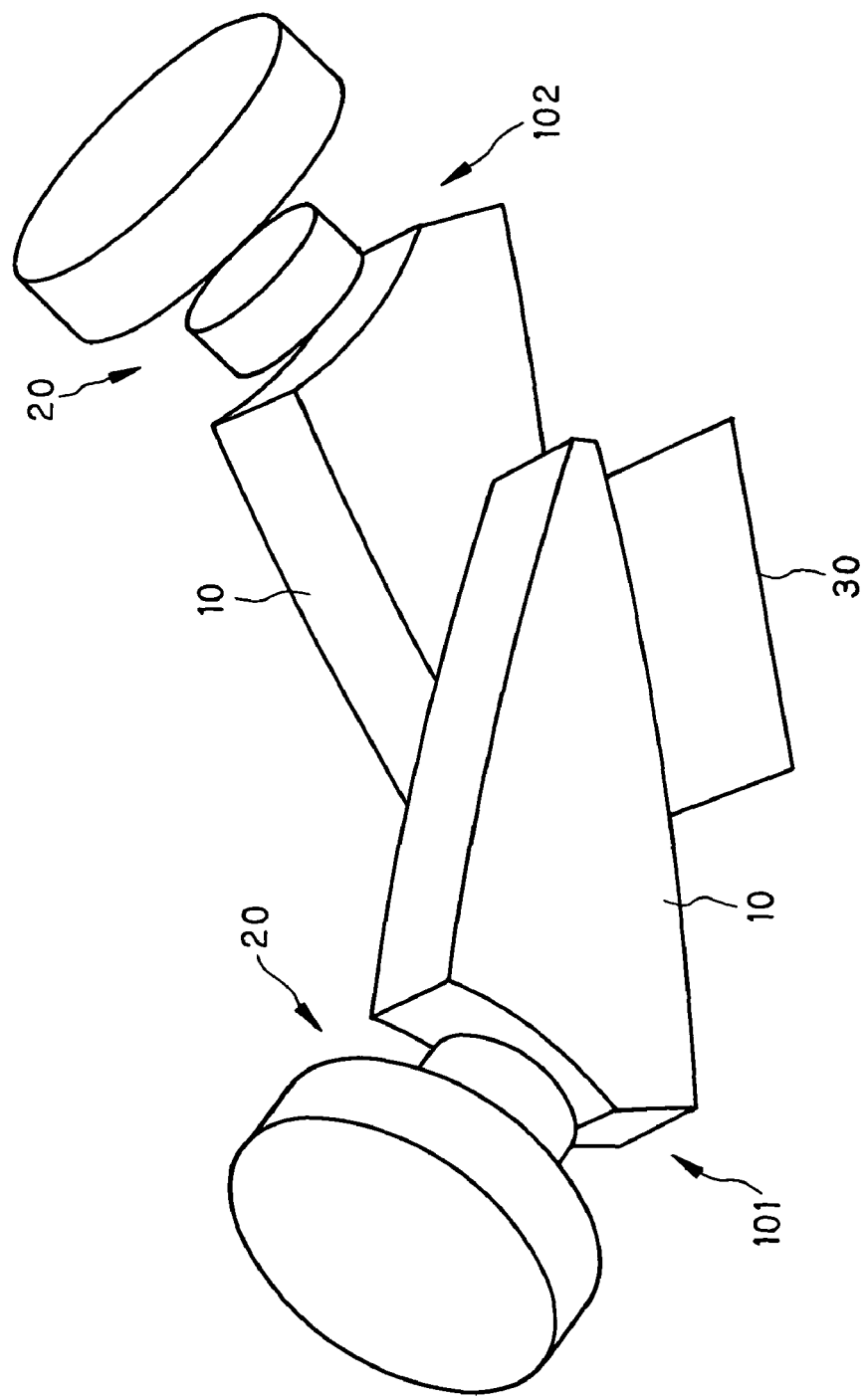
FIG. 3 is a perspective view of the optical apparatus of Example 1 according to the invention.

FIG. 2(a) is a perspective view of the optical apparatus here using two such optical systems as in FIG. 1, as viewed from above and below; FIG. 2(b) is a side view of that optical apparatus; and FIG. 3 is a perspective view of that optical apparatus. In this optical apparatus, two such optical systems 101 and 102 as in FIG. 1 are used. Both optical systems 101 and 102 are located side by side such that as one optical system 101 is rotated 180° with respect to another 102 and about an axial chief ray $1_1$ directing toward the image plane 3, the Y-Z planes of the respective optical systems 101 and 102 are parallel with each other, and a plane including axial chief rays $1_1$ and $1_2$ directing toward the image plane 3 of both optical systems 101 and 102 is vertical to the Y-Z planes: images formed by the respective optical systems 101 and 102 on the image plane 3 are formed side by side on a single imaging device 30.

If the optical apparatus is set up in this way, it can then be used as an on-vehicle camera capable of simultaneously taking and viewing a left image by one optical system 101 and a right image by another 102 on the single imaging device 30.

Referring here to how to divide the imaging plane of the imaging device 30, typically a horizontal imaging plane having a length-to-width ratio of 3:4, if images are taken on vertically arranged screens each having a length-to-width ratio of 1.5:4, it is then possible to make the horizontal angle of view wide. When a certain angle of view is needed in the vertical direction too, the imaging device 30 is vertically located at a length-to-width ratio of 4:3. It is then possible to take images on vertically arranged screens each having an aspect ratio of 2:3.

With the present invention, it is possible to reduce a parts count if, as the decentered prism optical systems 10 in two such optical systems 101 and 102, decentered prism systems of the same shape are located in such a way as to be mutually rotated 180° with respect to the imaging plane of the same imaging device 30. To hold the decentered prism optical system 10 in place, it is preferable that the optical systems 101 and 102 are provided with lugs or the like in their major direction because of the need of keeping them adjacent to each other. Further, when lugs or other supports are formed in their minor axis direction, it is preferable that they are formed on one side so that lug-free sides are kept adjacent to each other.

And to block off inessential light such as flares between the decentered prism optical systems 10, a light block coating material may be coated on the sides of the decentered prism optical systems 10 or, alternatively, a light block plate or the like may be interposed between the sides of the two decentered prism optical systems 10 to keep them adjacent to each other.

Further, a light block hood for blocking off light rays that, once passing through one decentered prism optical system 101, enters another 102 may be located on an object side with respect to the prism optical systems 101 and 102. In that case, an outer casing of the optical apparatus here may also serve as that light block hood.

Figure 4:
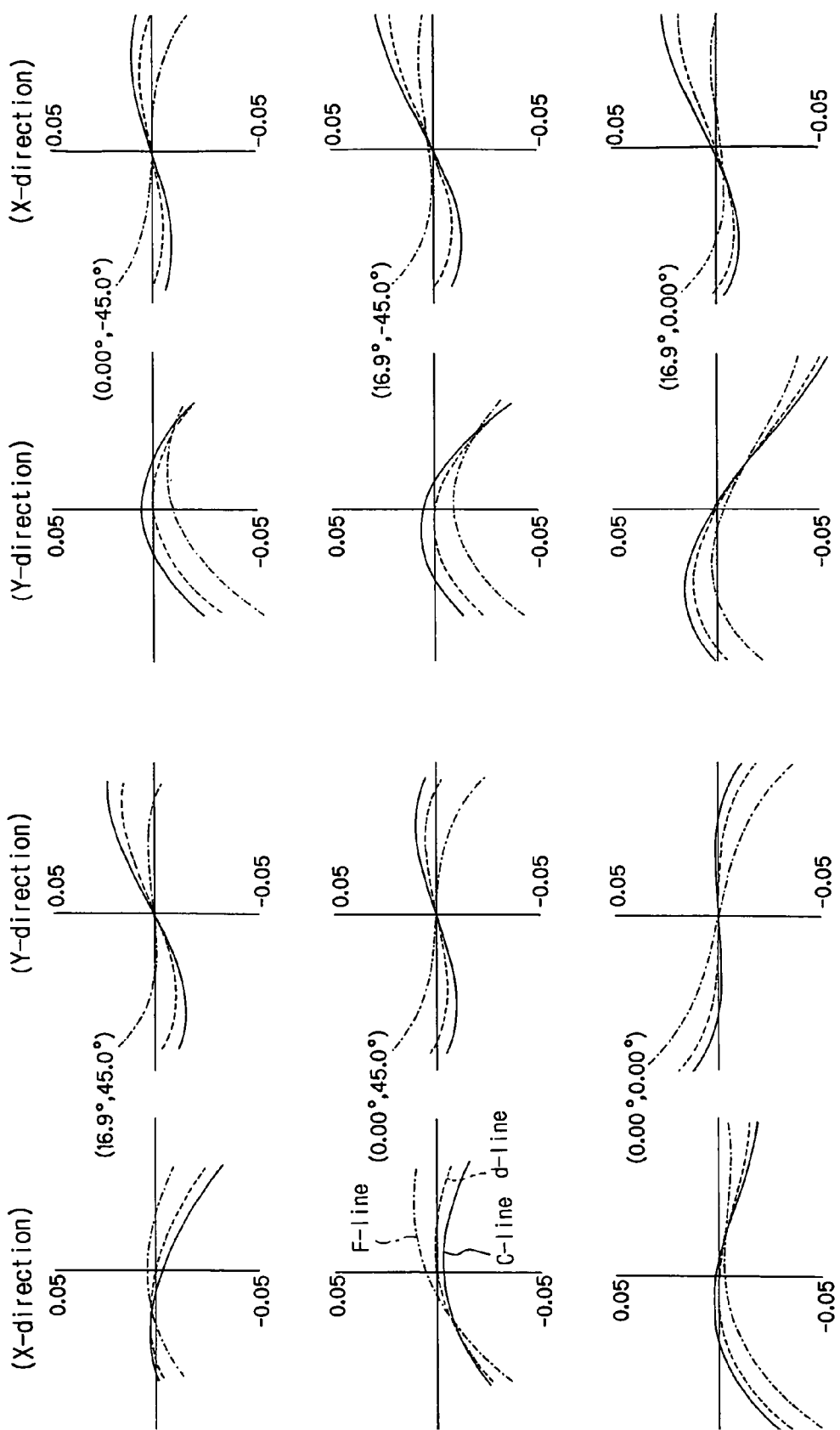
FIG. 4 is a transverse aberration diagram for the optical systems of Example 1.

Transverse aberrations of the optical systems 101 and 102 in Example 1 are depicted in FIG. 4. In this transverse aberration diagram, the bracketed figures stand for (angles of view in the X-direction and the Y-direction), indicative of transverse aberrations at those angles of view. The same will apply hereinafter.

The specifications of the optical systems of Example 1 are:
Angle of view: 33.8°×90.0°
Entrance pupil diameter: φ1.0 mm
Focal length: 5.3 mm
F-number: 5.3

Figure 5:
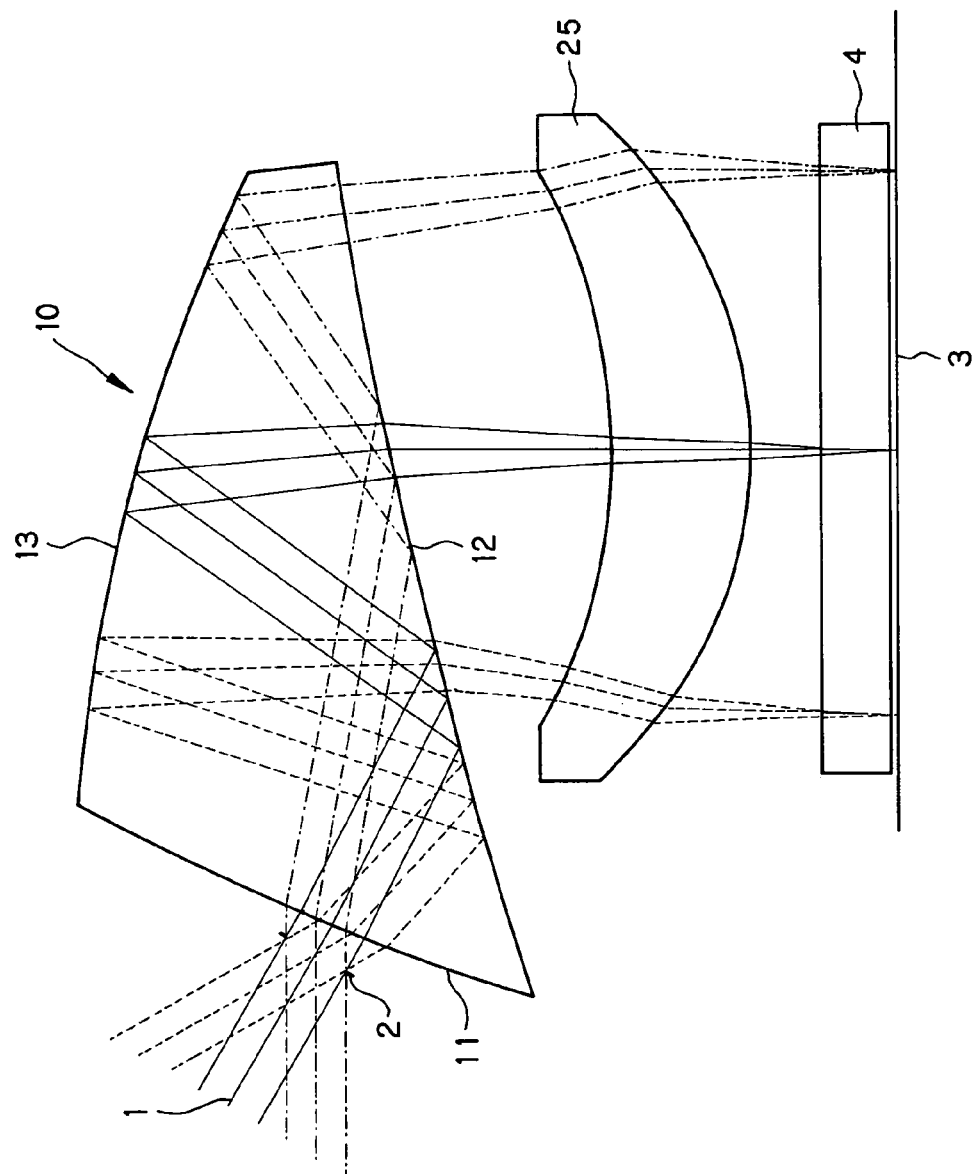
FIG. 5 is illustrative in the section including axial chief rays of one optical system in the optical apparatus of Example 2 according to the invention.

FIG. 5 is a Y-Z sectional view of one optical system in the optical apparatus of Example 2, including an axial chief ray 1. This optical system is made up of a stop 2 located nearest to an object side, a decentered prism optical system 10 located on an image side with respect to the stop 2, a rotationally symmetric positive meniscus lens 25 convex on its image side, and an image plane 3, with a cover glass 4 positioned in front of the image plane 3. The decentered prism optical system 10 is formed of a medium that includes a first surface 11 that is an entrance surface having transmission, a second surface 12 that has reflection plus transmission and a third surface 13 having reflection and has a refractive index of 1.3 or greater. Light rays from an object that pass through the stop 2 enter the medium through the first surface 11, are totally reflected at the second surface 12 and then reflected at the third surface 13. The reflected light rays leave the decentered prism optical system 10 this time through the second surface 12, passing through the positive meniscus lens 25 and forming an object image on the image plane 3 via the cover glass 4.

And the first surface 11, the second surface 12 and the third surface 13 of the decentered prism optical system 10 are each constructed of a free-form surface having the Y-Z plane as only one plane of symmetry, and configured in such a rotationally asymmetric surface shape as to give power to light beams and correct aberrations resulting from decentration. For correction of aberrations resulting from decentration, it is effective to configure especially the reflecting surface into such a surface shape.

Thus, by using for the optical system in the optical apparatus the decentered prism optical system 10 in which at least one of three surfaces is constructed of a rotationally asymmetric plane, it is then possible to set up an imaging optical system that is simple in construction with a reduced parts count and capable of taking less distorted images with high peripheral resolution even at wide angles of view.

Figure 6B:
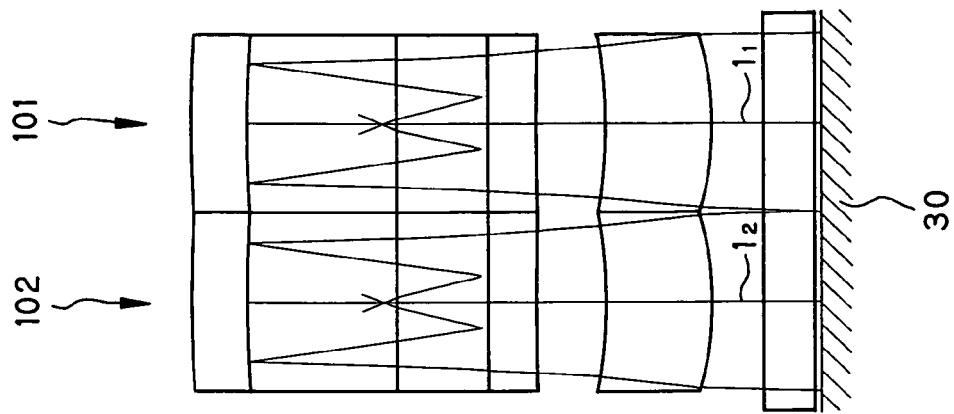
FIGS. 6(a) and 6(b) are illustrative in perspective and side of the optical apparatus of Example 1 using two such optical systems as in FIG. 5, as viewed from above and below.
Figure 6A:
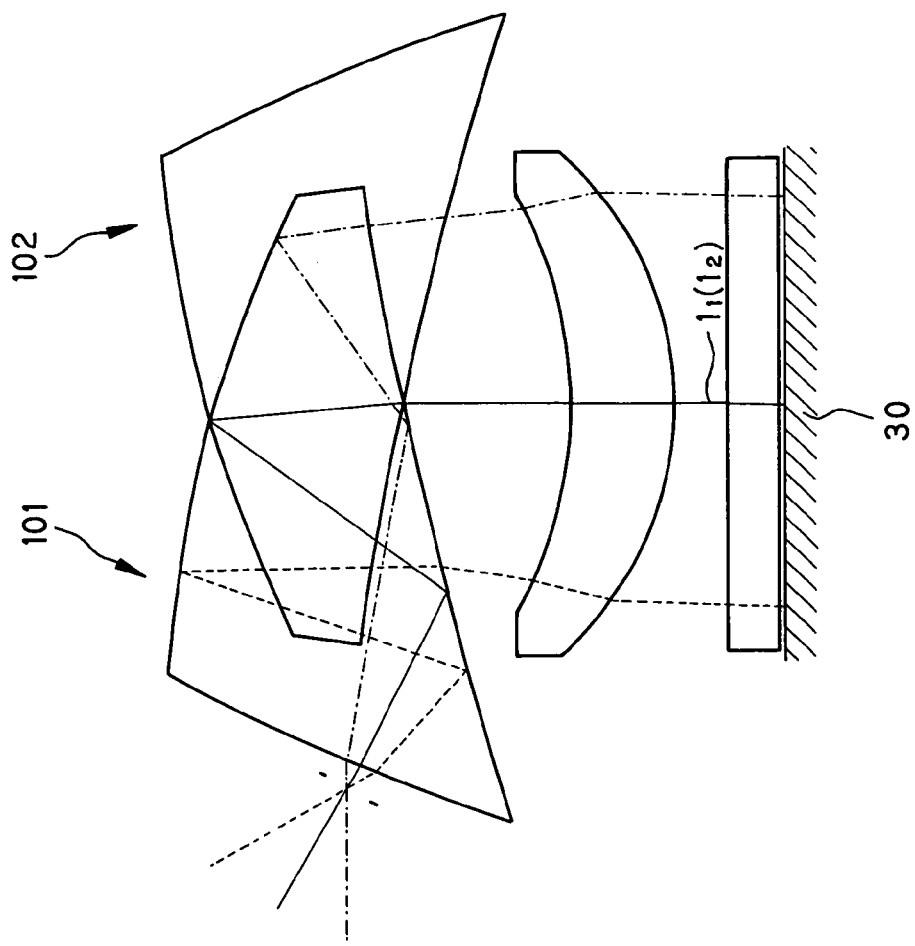

FIG. 6(a) is a perspective view of the optical apparatus here using two such optical systems as in FIG. 5, as viewed from above and below, and FIG. 6(b) is a side view of that optical apparatus. In this optical apparatus, two such optical systems 101 and 102 as in FIG. 5 are used. Both optical systems 101 and 102 are located side by side such that as one optical system 101 is rotated 180° with respect to another 102 and about an axial chief ray 1 directing toward the image plane 3, the Y-Z planes of the respective optical systems 101 and 102 are parallel with each other, and a plane including axial chief rays $1_1$ and $1_2$ directing toward the image plane 3 of both optical systems 101 and 102 is vertical to the Y-Z planes: images formed by the respective optical systems 101 and 102 on the image plane 3 are formed side by side on a single imaging device 30.

If the optical apparatus is set up in this way, it can then be used as an on-vehicle camera capable of simultaneously taking and viewing a left image by one optical system 101 and a right image by another 102 on the single imaging device 30.

Referring here to how to divide the imaging plane of the imaging device 30, typically a horizontal imaging plane having a length-to-width ratio of 3:4, if images are taken on vertically arranged screens each having a length-to-width ratio of 1.5:4, it is then possible to make the horizontal angle of view wide. When a certain angle of view is needed in the vertical direction too, the imaging device 30 is vertically located at a length-to-width ratio of 4:3. It is then possible to take images on vertically arranged screens each having an aspect ratio of 2:3.

With the present invention, it is possible to reduce a parts count if, as the decentered prism optical systems 10 in two such optical systems 101 and 102, decentered prism systems of the same shape are located in such a way as to be mutually rotated 180° with respect to the imaging plane of the same imaging device 30. To hold the decentered prism optical system 10 in place, it is preferable that the optical systems 101 and 102 are provided with lugs or the like in their major direction because of the need of keeping them adjacent to each other. Further, when lugs or other supports are formed in their minor axis direction, it is preferable that they are formed on one side so that lug-free sides are kept adjacent to each other.

And to block off inessential light such as flares between the decentered prism optical systems 10, a light block coating material may be coated on the sides of the decentered prism optical systems 10 or, alternatively, a light block plate or the like may be interposed between the sides of the two decentered prism optical systems 10 to keep them adjacent to each other.

Further, an outer casing of the optical apparatus here may also serve as the light block hoods of the respective optical systems 101 and 102.

Figure 7:
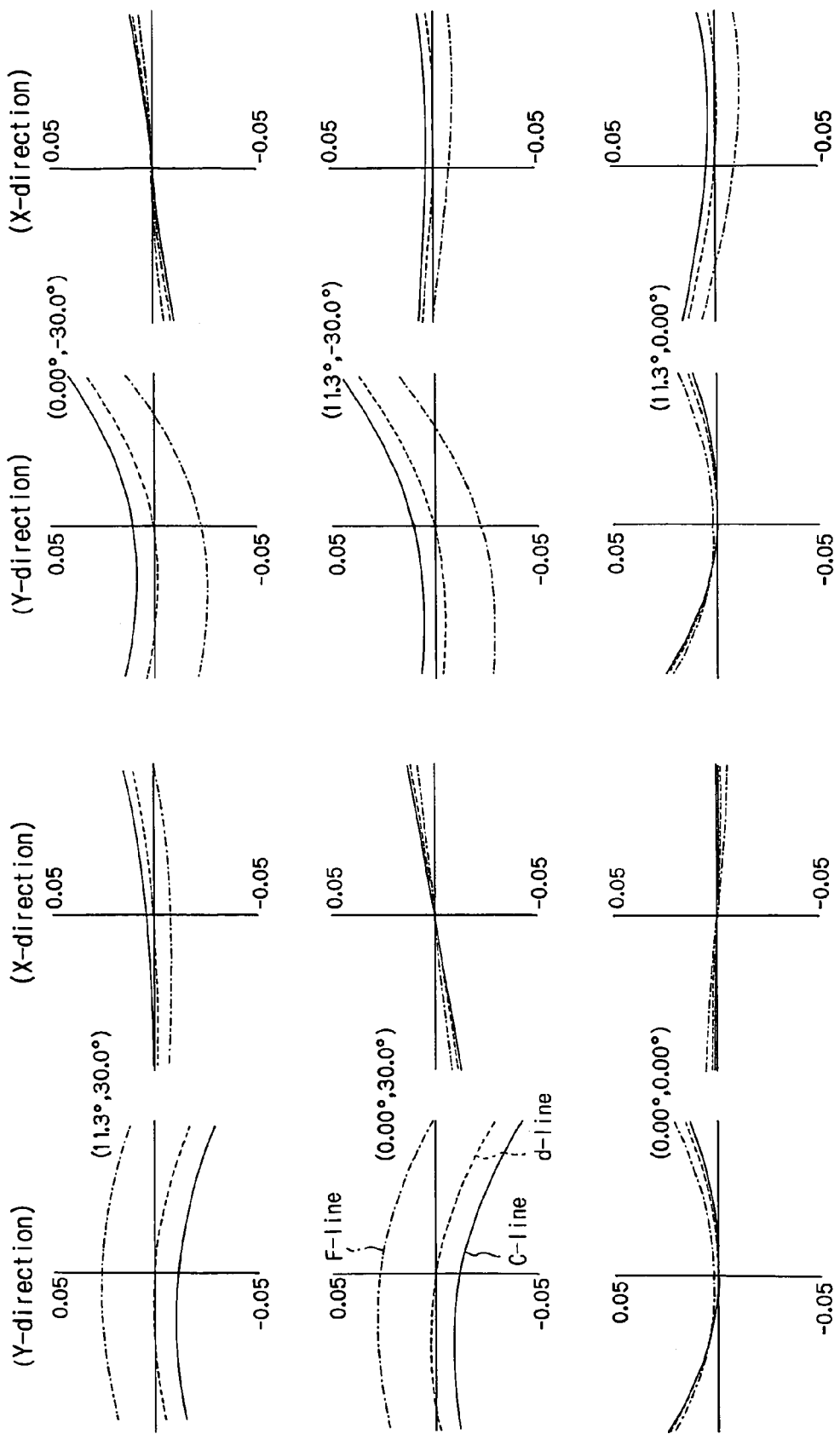
FIG. 7 is a transverse aberration diagram for the optical systems of Example 2.

Transverse aberrations of the optical systems 101 and 102 in Example 2 are depicted in FIG. 7.

The specifications of the optical systems of Example 2 are:
Angle of view: 22.5°×60.0°
Entrance pupil diameter: ϕ1.0 mm
Focal length: 8.0 mm
F-number: 8.1

Figure 8:
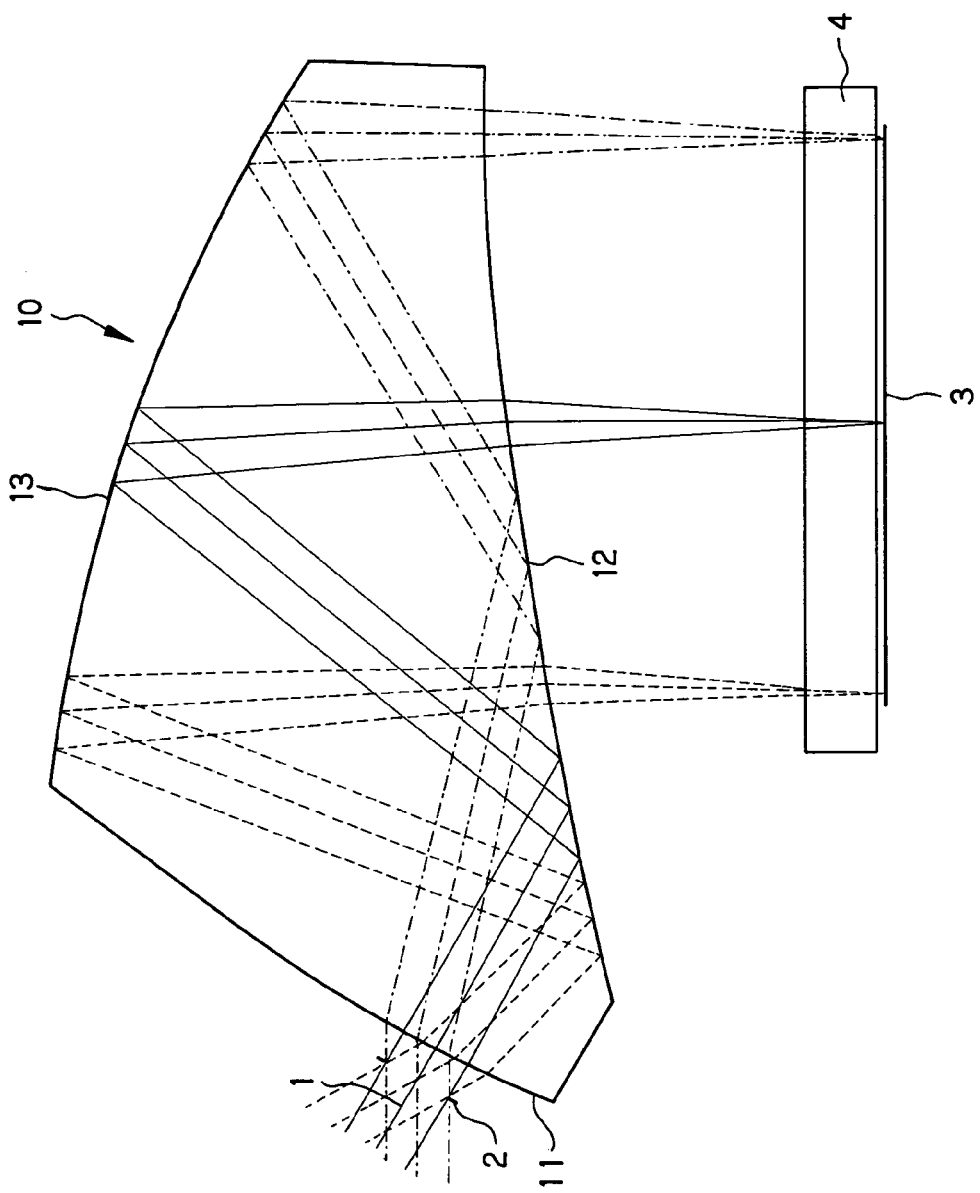
FIG. 8 is illustrative in the section including axial chief rays of one optical system in the optical apparatus of Example 3 according to the invention.

FIG. 8 is a Y-Z sectional view of one optical system in the optical apparatus of Example 3, including an axial chief ray 1. This optical system consists only of a stop 2 located nearest to an object side and a decentered prism optical system 10 located on an image side with respect to the stop 2, with a cover glass 4 positioned in front of an image plane 3. The decentered prism optical system 10 is formed of a medium that includes a first surface 11 that is an entrance surface having transmission, a second surface 12 that has reflection plus transmission and a third surface 13 having reflection and has a refractive index of 1.3 or greater. Light rays from an object that pass through the stop 2 enter the medium through the first surface 11, are totally reflected at the second surface 12 and then reflected at the third surface 13. The reflected light rays leave the decentered prism optical system 10 this time through the second surface 12, passing through the decentered prism optical system 10 and forming an object image on the image plane 3 via the cover glass 4.

And the first surface 11, the second surface 12 and the third surface 13 of the decentered prism optical system 10 are each constructed of a free-form surface having the Y-Z plane as only one plane of symmetry, and configured in such a rotationally asymmetric surface shape as to give power to light beams and correct aberrations resulting from decentration. For correction of aberrations resulting from decentration, it is effective to configure especially the reflecting surface into such a surface shape.

Thus, by using for the optical system in the optical apparatus the decentered prism optical system 10 in which at least one of three surfaces is constructed of a rotationally asymmetric plane, it is then possible to set up an imaging optical system that is simple in construction with a reduced parts count and capable of taking less distorted images with high peripheral resolution even at a wide angle of view.

FIG. 9(a) is a perspective view of the optical apparatus here using two such optical systems as in FIG. 8, as viewed from above and below, and FIG. 9(b) is a side view of that optical apparatus. In this optical apparatus, two such optical systems 101 and 102 as in FIG. 8 are used. Both optical systems 101 and 102 are located side by side such that as one optical system 101 is rotated 180° with respect to another 102 and about an axial chief ray $1_1$ directing toward the image plane 3, the Y-Z planes of the respective optical systems 101 and 102 are parallel with each other, and a plane including axial chief rays $1_1$ and $1_2$ directing toward the image plane 3 of both optical systems 101 and 102 is vertical to the Y-Z planes: images formed by the respective optical systems 101 and 102 on the image plane 3 are formed side by side on a single imaging device 30.

If the optical apparatus is constructed in this way, it can then be used as an on-vehicle camera capable of simultaneously taking and viewing a left image by one optical system 101 and a right image by another 102 on the single imaging device 30.

Referring here to how to divide the imaging plane of the imaging device 30, typically a horizontal imaging plane having a length-to-width ratio of 3:4, if images are taken on vertically arranged screens each having a length-to-width ratio of 1.5:4, it is then possible to make the horizontal angle of view wide. When a certain angle of view is needed in the vertical direction too, the imaging device 30 is vertically located at a length-to-width ratio of 4:3. It is then possible to take images on vertically arranged screens each having an aspect ratio of 2:3.

With the present invention, it is possible to reduce a parts count if, as the decentered prism optical systems 10 in two such optical systems 101 and 102, decentered prism systems of the same shape are located in such a way as to be mutually rotated 180° with respect to the imaging plane of the same imaging device 30. To hold the decentered prism optical system 10 in place, it is preferable that the optical systems 101 and 102 are provided with lugs or the like in their major direction because of the need of keeping them adjacent to each other. Further, when lugs or other supports are formed in their minor axis direction, it is preferable that they are formed on one side so that lug-free sides are kept adjacent to each other.

And to block off inessential light such as flares between the decentered prism optical systems 10, a light block coating material may be coated on the sides of the decentered prism optical systems 10 or, alternatively, a light block plate or the like may be interposed between the sides of the two decentered prism optical systems 10 to keep them adjacent to each other.

Further, an outer casing of the optical apparatus here may also serve as the light block hoods of the respective optical systems 101 and 102.

Figure 10:
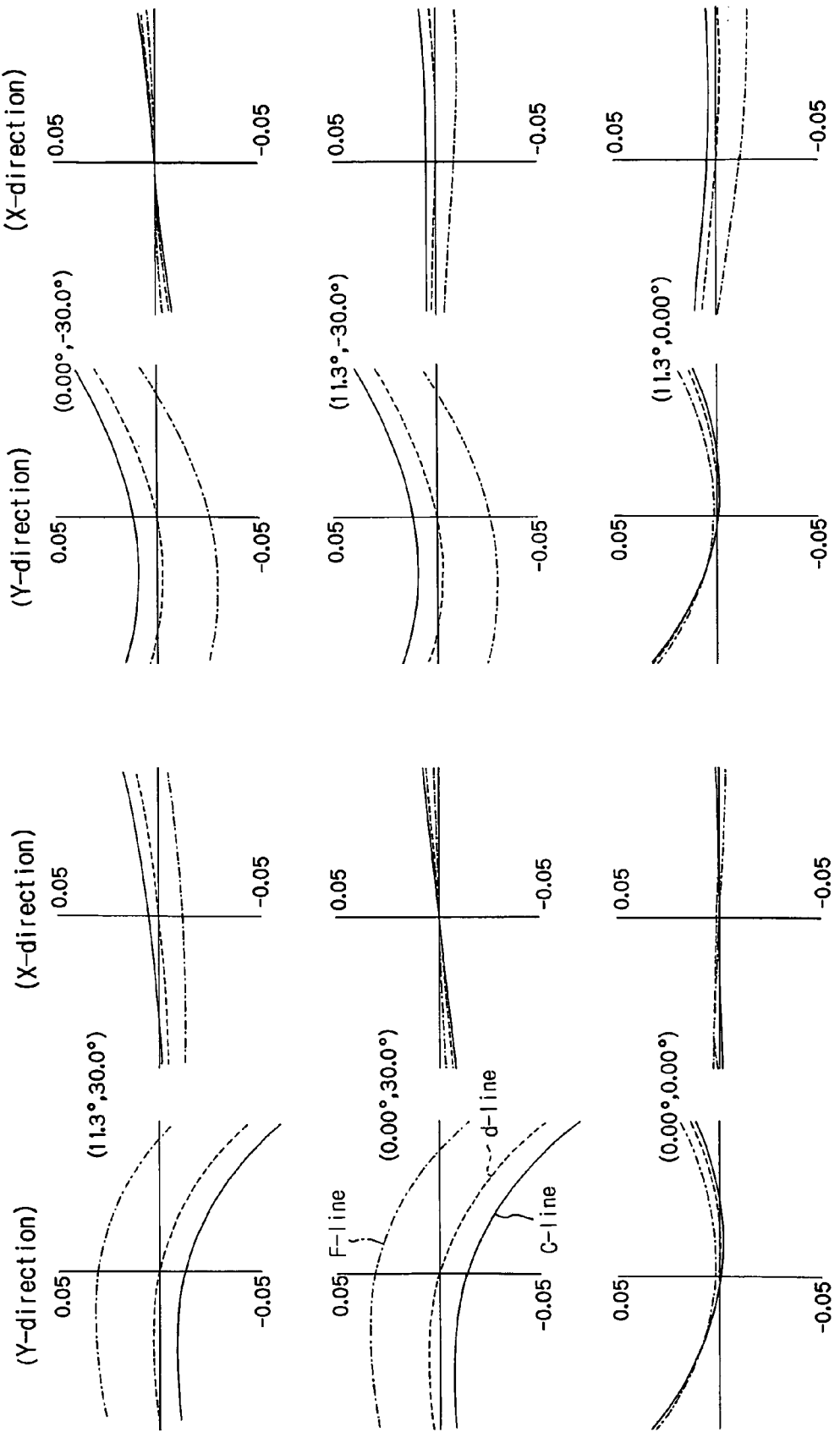
FIG. 10 is a transverse aberration diagram for the optical systems of Example 3.

Transverse aberrations of the optical systems 101 and 102 in Example 3 are depicted in FIG. 10.

The specifications of the optical systems of Example 3 are:
Angle of view: 22.5°×60.0°
Entrance pupil diameter: ϕ1.0 mm
Focal length: 7.8 mm
F-number: 7.9

Set out below are the constituting parameters of Examples 1, 2 and 3. Note here that the acronyms "FFS", "ASS" and "RS" are indicative of the free-form surface, the rotationally symmetric aspheric surface, and the reflecting surface, respectively.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | 9.58 | 1.00 | | 1.4875 | 70.4 |
| 2 | ASS [1] | 3.00 | | | |
| 3 | ASS [2] | 2.00 | | 1.8467 | 23.8 |
| 4 | 15.33 | 1.00 | | | |
| 5 | ∞ (Stop) | | | | |
| 6 | FFS [1] | | (1) | 1.8061 | 40.9 |
| 7 | FFS [2] (RS) | | (2) | 1.8061 | 40.9 |
| 8 | FFS [3] (RS) | | (3) | 1.8061 | 40.9 |
| 9 | FFS [2] | | (2) | | |
| 10 | ∞ | 1.00 | (4) | 1.5163 | 64.1 |
| 11 | ∞ | 0.10 | | | |
| Image plane | ∞ | | | | |

| ASS [1] | |
|---|---|
| R | 2.66 |
| k | $-2.0725 \times 10^{-2}$ |
| b | $7.2049 \times 10^{-5}$ |

| ASS [2] | |
|---|---|
| R | 5.37 |
| k | 2.7549 |
| b | $1.0193 \times 10^{-5}$ |

FFS [1]

| $C_4$ | $9.1284 \times 10^{-3}$ | $C_6$ | $-6.2245 \times 10^{-2}$ | | |

FFS [2]

| $C_4$ | $2.2356 \times 10^{-2}$ | $C_6$ | $-8.2677 \times 10^{-3}$ | $C_8$ | $-4.3925 \times 10^{-4}$ |
| $C_{10}$ | $-4.9405 \times 10^{-5}$ | | | | |

FFS [3]

| $C_4$ | $3.1574 \times 10^{-2}$ | $C_6$ | $1.1019 \times 10^{-2}$ | $C_8$ | $1.7708 \times 10^{-4}$ |
| $C_{10}$ | $-5.9253 \times 10^{-4}$ | | | | |

Displacement and tilt (1)

| X | 0.00 | Y | 0.00 | Z | 0.10 |
| α | 4.75 | β | 0.00 | γ | 0.00 |

Displacement and tilt (2)

| X | 0.00 | Y | 0.00 | Z | 5.91 |
| α | −48.61 | β | 0.00 | γ | 0.00 |

Displacement and tilt (3)

| X | 0.00 | Y | 6.08 | Z | 7.06 |
| α | −71.52 | β | 0.00 | γ | 0.00 |

Displacement and tilt (4)

| X | 0.00 | Y | 0.00 | Z | 13.20 |
| α | 135.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS [1] | | (1) | 1.8061 | 40.9 |
| 3 | FFS [2] (RS) | | (2) | 1.8061 | 40.9 |
| 4 | FFS [3] (RS) | | (3) | 1.8061 | 40.9 |
| 5 | FFS [2] | | (2) | | |
| 6 | 8.36 | 2.00 | (4) | 1.4875 | 70.4 |
| 7 | 6.50 | 1.00 | | | |
| 8 | ∞ | 1.00 | | 1.5163 | 64.1 |
| 9 | ∞ | 0.10 | | | |
| Image plane | ∞ | | | | |

FFS [1]

| $C_4$ | $1.3373 \times 10^{-2}$ | $C_6$ | $1.3725 \times 10^{-2}$ | | |

FFS [2]

| $C_4$ | $5.7393 \times 10^{-3}$ | $C_6$ | $5.4512 \times 10^{-3}$ | $C_8$ | $-1.9425 \times 10^{-5}$ |
| $C_{10}$ | $-5.2533 \times 10^{-4}$ | $C_{11}$ | $3.1447 \times 10^{-4}$ | $C_{13}$ | $6.3886 \times 10^{-5}$ |
| $C_{15}$ | $5.6041 \times 10^{-5}$ | | | | |

FFS [3]

| $C_4$ | $2.0000 \times 10^{-2}$ | $C_6$ | $2.0000 \times 10^{-2}$ | $C_8$ | $3.3583 \times 10^{-4}$ |
| $C_{10}$ | $8.4202 \times 10^{-6}$ | $C_{11}$ | $6.6984 \times 10^{-5}$ | $C_{13}$ | $-4.6499 \times 10^{-5}$ |
| $C_{15}$ | $-2.2973 \times 10^{-6}$ | | | | |

Displacement and tilt (1)

| X | 0.00 | Y | 0.00 | Z | 0.50 |
| α | 7.76 | β | 0.00 | γ | 0.00 |

Displacement and tilt (2)

| X | 0.00 | Y | 0.00 | Z | 3.98 |
| α | -46.18 | β | 0.00 | γ | 0.00 |

Displacement and tilt (3)

| X | 0.00 | Y | 5.79 | Z | 4.82 |
| α | -75.44 | β | 0.00 | γ | 0.00 |

Displacement and tilt (4)

| X | 0.00 | Y | 0.00 | Z | 8.56 |
| α | 120.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS [1] | | (1) | 1.8061 | 40.9 |
| 3 | FFS [2] (RS) | | (2) | 1.8061 | 40.9 |
| 4 | FFS [3] (RS) | | (3) | 1.8061 | 40.9 |
| 5 | FFS [2] | | (2) | | |
| 6 | ∞ | 1.00 | (4) | 1.5163 | 64.1 |
| 7 | ∞ | 0.10 | | | |
| Image plane | ∞ | | | | |

FFS [1]

| $C_4$ | $1.8025 \times 10^{-2}$ | $C_6$ | $2.4696 \times 10^{-2}$ | | |

FFS [2]

| $C_4$ | $7.7096 \times 10^{-3}$ | $C_6$ | $6.6093 \times 10^{-3}$ | $C_8$ | $-6.5307 \times 10^{-4}$ |
| $C_{10}$ | $-7.0855 \times 10^{-4}$ | $C_{11}$ | $2.5191 \times 10^{-4}$ | $C_{13}$ | $-1.6152 \times 10^{-6}$ |
| $C_{15}$ | $7.0169 \times 10^{-5}$ | | | | |

FFS [3]

| $C_4$ | $2.0000 \times 10^{-2}$ | $C_6$ | $2.0000 \times 10^{-2}$ | $C_8$ | $-8.7665 \times 10^{-5}$ |
| $C_{10}$ | $3.4103 \times 10^{-6}$ | $C_{11}$ | $6.1612 \times 10^{-5}$ | $C_{13}$ | $6.8121 \times 10^{-6}$ |
| $C_{15}$ | $2.9135 \times 10^{-5}$ | | | | |

Displacement and tilt (1)

| X | 0.00 | Y | 0.00 | Z | 0.50 |
| α | 2.70 | β | 0.00 | γ | 0.00 |

Displacement and tilt (2)

| X | 0.00 | Y | 0.00 | Z | 4.30 |
| α | -49.35 | β | 0.00 | γ | 0.00 |

Displacement and tilt (3)

| X | 0.00 | Y | 8.01 | Z | 5.81 |
| α | -78.40 | β | 0.00 | γ | 0.00 |

Displacement and tilt (4)

| X | 0.00 | Y | 0.00 | Z | 10.78 |
| α | 120.00 | β | 0.00 | γ | 0.00 |

Figure 11:
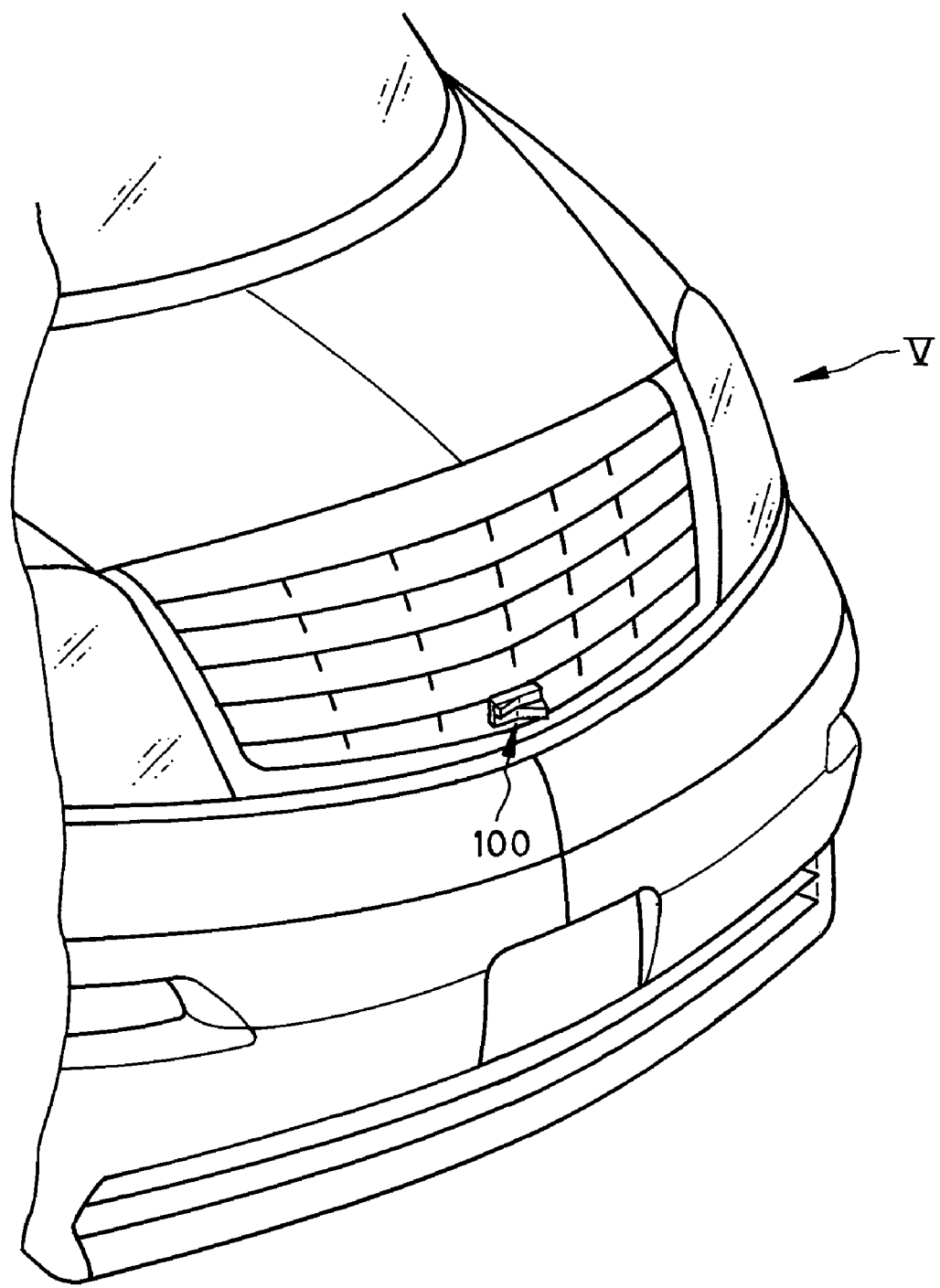
FIG. 11 is illustrative of the inventive optical apparatus that is being used as a double-side monitor on the front of a car.

As shown in FIG. 11, the inventive optical apparatus 100 capable of simultaneously taking images in both the right and left directions may typically be used as a double-side monitor of the front of a car V to be attached to the end of the car.

The inventive optical apparatus may also be designed such that when at least two prisms are positioned on the cover member side of the imaging device (if the imaging device includes that cover member) and arranged vertically, one of them guides light incident from the right direction to the imaging device and another guides light incident from the left direction to the imaging device, with each of the two prisms having a curved reflecting surface.

Preferably in this case, each of the two prisms has a plurality of curved reflecting surfaces.

Preferably, each of the two prisms has also a concave reflecting surface.

Preferably, each of the two prisms has a first surface through which the axial chief rays transmit, a second surface that reflects the axial chief rays from that first surface, and a third surface that reflects the axial chief rays from the second surface.

Preferably in this case, the second surfaces of the two prisms tilt in different directions with respect to the cover member of the imaging device.

Preferably, there are two stops positioned on an object side with respect to the first surfaces of the two prisms.

Preferably in this case, there is an optical element positioned on the object side of one of the two stops.

Preferably in this case, the optical element in the direction in which the two prisms are arranged is larger in size than each of the prisms in the direction in which they are arranged.

Applicability to the Industry

With the present invention as described above, it is possible to achieve an optical apparatus allowing images in multiple directions to be simultaneously taken with simple construction using a prism optical system yet with high definitions even at wide angles of view.

I claim:

1. An optical apparatus using a prism optical system which has three optical surfaces: from an object side thereof, a first surface having transmission, a second surface having internal reflection plus transmission and a third surface having reflection and is formed of a medium having a refractive index of 1.3 or greater and in which light enters the medium through the first surface (11), is totally reflected at the second surface (12) and then reflected at the third surface (13), and finally leaves the medium this time through the second surface (12), characterized in that at least two said prism optical systems are arranged side by side with respect to an imaging plane of a single imaging device so that images in at least two directions are formed side by side on the imaging plane of the single imaging device, and at least one of three surfaces of each of said prism optical systems has a reflecting surface defined by a rotationally asymmetric plane.

2. An optical apparatus as recited in claim 1, characterized in that two said prism optical systems are arranged side by side, and said two prism optical systems comprise prism optical systems that are of the same shape and positioned such that one of said prism optical systems is rotated 180° with respect to another and about axial chief rays directing toward an image plane to keep said axial chief rays parallel with one another.

3. An optical apparatus as recited in claim 2, characterized in that said two prism optical systems are provided between them with a light block member for blocking off light from the adjacent prism optical systems.

4. An optical apparatus as recited in claim 2 or 3, characterized by further including a hood that is located on an object side with respect to said prism optical systems and adapted to block off light rays that are incident on adjacent said prism optical systems and, once passing through one of said prism optical systems, enter another.

5. An optical apparatus as recited in claim 1, characterized by being used as an onboard camera capable of simultaneously viewing both right and left directions.

* * * * *